(12) United States Patent
Grimm et al.

(10) Patent No.: US 10,808,086 B2
(45) Date of Patent: Oct. 20, 2020

(54) FIBER COMPOSITE MATERIAL, USE THEREFOR, AND METHOD FOR THE PRODUCTION THEREOF

(71) Applicant: Covestro Deutschland AG, Leverkusen (DE)

(72) Inventors: Thomas Grimm, Pulheim (DE); Vera Taschner, Langenfeld (DE); Eckhard Wenz, Cologne (DE); Thomas Höhnk, Grevenbroich (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/027,736

(22) PCT Filed: Oct. 6, 2014

(86) PCT No.: PCT/EP2014/071300
§ 371 (c)(1),
(2) Date: Apr. 7, 2016

(87) PCT Pub. No.: WO2015/052114
PCT Pub. Date: Apr. 16, 2015

(65) Prior Publication Data
US 2016/0257794 A1   Sep. 8, 2016

(30) Foreign Application Priority Data

Oct. 8, 2013  (EP) .................................... 13187763

(51) Int. Cl.
| C08J 5/04 | (2006.01) |
| C08J 5/10 | (2006.01) |
| B29C 70/50 | (2006.01) |
| C08K 5/523 | (2006.01) |
| C08K 5/5313 | (2006.01) |
| C08K 5/5399 | (2006.01) |

(52) U.S. Cl.
CPC ............. C08J 5/043 (2013.01); B29C 70/504 (2013.01); C08J 5/10 (2013.01); *C08J 2369/00* (2013.01); *C08J 2455/02* (2013.01); *C08K 5/523* (2013.01); *C08K 5/5313* (2013.01); *C08K 5/5399* (2013.01)

(58) Field of Classification Search
CPC ........... C08J 5/043; C08J 5/10; C08K 5/5313; C08K 5/5399; B29C 70/504
See application file for complete search history.

(56) References Cited

U.S. PATENT DOCUMENTS

| 2,393,967 A | 2/1946 | Brubaker |
| 3,419,634 A | 12/1968 | Vaughn |
| 3,553,167 A | 1/1971 | Schnell et al. |
| 3,564,077 A | 2/1971 | Brinkmann et al. |
| 3,644,574 A | 2/1972 | Jackson et al. |
| 3,671,487 A | 6/1972 | Abolins |
| 3,692,744 A | 9/1972 | Rich et al. |
| 3,723,373 A | 3/1973 | Lucas |
| 3,838,092 A | 9/1974 | Vogt et al. |
| 3,919,353 A | 11/1975 | Castelnuovo et al. |
| 4,035,958 A | 7/1977 | Nishio |
| 4,049,612 A * | 9/1977 | Sandler ................ C08K 5/5313 524/126 |
| 4,075,173 A | 2/1978 | Maruyama et al. |
| 4,156,069 A | 5/1979 | Prevorsek et al. |
| 4,176,224 A | 11/1979 | Bier et al. |
| 4,269,964 A | 5/1981 | Freitag et al. |
| 4,311,823 A | 1/1982 | Imai et al. |
| 4,334,053 A | 6/1982 | Freitag et al. |
| 4,584,360 A | 4/1986 | Paul et al. |
| 4,806,593 A | 2/1989 | Kress et al. |
| 4,982,014 A | 1/1991 | Freitag et al. |
| 5,672,645 A | 9/1997 | Eckel et al. |

(Continued)

FOREIGN PATENT DOCUMENTS

| CA | 1173998 A | 9/1984 |
| DE | 1 900 270 A1 | 11/1969 |

(Continued)

OTHER PUBLICATIONS

International Search Report for PCT/EP2014/071300 dated Jan. 23, 2015.

*Primary Examiner* — Edward J Cain
(74) *Attorney, Agent, or Firm* — Faegre Drinker Biddle & Reath LLP

(57) ABSTRACT

The invention relates to a fibre composite (42) comprising at least one fibre layer (4, 14, 16) composed of a fibre material which is embedded in a matrix (8, 18) based on a thermoplastic, where the composition of the matrix (8, 18) contains: 60-95 parts by weight of aromatic polycarbonate and/or aromatic polyester carbonate and further additives. The invention further relates to the use of such a fibre composite for a component for a rail vehicle, in particular for a rail vehicle for transporting passengers. The invention further relates to a process for producing a fibre composite, in which a layer structure (36) of superposed layers is formed from at least one fibre layer (4, 14, 16) composed of a fibre material and from polymer layers which are composed of at least one polymer film (30) and are arranged on both sides of the fibre layer (4, 14, 16) and in which the layer structure (36) is pressed under applied pressure and the action of heat to form a fibre composite (42), where the polymer film (30) has a composition corresponding to the matrix of the abovementioned fibre composite.

14 Claims, 1 Drawing Sheet

(56) References Cited

U.S. PATENT DOCUMENTS

| | | | |
|---|---|---|---|
| 2003/0083442 A1* | 5/2003 | Nishihara | C08K 5/0066 525/464 |
| 2008/0182926 A1* | 7/2008 | Lim | C08F 279/02 524/97 |
| 2011/0152416 A1 | 6/2011 | Eckel et al. | |

FOREIGN PATENT DOCUMENTS

| | | |
|---|---|---|
| DE | 1 495 626 B1 | 6/1971 |
| DE | 1 694 173 A1 | 6/1971 |
| DE | 2 232 877 A1 | 1/1974 |
| DE | 2407674 A1 | 10/1974 |
| DE | 2 348 377 A1 | 4/1975 |
| DE | 2407776 A1 | 9/1975 |
| DE | 2 703 376 A1 | 8/1977 |
| DE | 2714544 A1 | 10/1977 |
| DE | 2715932 A1 | 10/1978 |
| DE | 2842005 A1 | 4/1980 |
| DE | 3 000 610 A1 | 7/1980 |
| DE | 2 940 024 A1 | 4/1981 |
| DE | 3 007 934 A1 | 9/1981 |
| DE | 3334782 A1 | 10/1984 |
| DE | 3 631 540 A1 | 3/1988 |
| DE | 3832396 A1 | 2/1990 |
| EP | 0363608 A1 | 4/1990 |
| EP | 0 640 655 A2 | 3/1995 |
| GB | 1485586 A | 9/1977 |
| JP | 2005239939 A | 9/2005 |
| WO | WO-2011107273 A1 | 9/2011 |

\* cited by examiner

FIBER COMPOSITE MATERIAL, USE THEREFOR, AND METHOD FOR THE PRODUCTION THEREOF

CROSS-REFERENCE TO RELATED APPLICATIONS

This application is a national stage application (under 35 U.S.C. § 371) of PCT/EP2014/071300, filed Oct. 6, 2014, which claims benefit of European Application No. 13187763.1, filed Oct. 8, 2013, both of which are incorporated herein by reference in their entirety.

The invention relates to a fibre composite comprising at least one fibre layer of a fibre material which is embedded in a matrix based on a thermoplastic. Furthermore, the invention relates to uses for such a fibre composite and also a process for producing a fibre composite.

BACKGROUND OF THE INVENTION

Fibre composites have long been known in the prior art, for example in sheet form as fibre composite sheets. Fibre composite sheets having a matrix based on a thermoplastic are also referred to as "composite sheets" in the prior art. Compared to extruded polymer sheets without fibre reinforcement, these composite sheets have a greater strength and stiffness and even approach the strength and stiffness of metallic sheets or can even exceed these.

Since composite sheets have a considerably lower weight compared to metallic sheets having comparable mechanical properties, composite sheets are, in the prior art, used especially in automobile and aircraft construction in order to achieve weight savings without the mechanical properties suffering.

A process for producing a composite sheet is known, for example, from the prior art (e.g. DE 29 48 235 C2).

In the use of composite sheets and fibre composites in general, not only the weight and the mechanical properties but also safety aspects play a large role, in particular with regard to fire protection.

Fibre-reinforced composites which have good fire protection properties and accordingly have a UL 94 classification of V-1 or better at thicknesses of ≤2 mm are known from the prior art. Thus, JP 2005239939 A describes, for example, a fibre-reinforced composite having a thermoplastic polymer matrix and containing phosphorus compounds, for example red phosphorus, as flame retardant.

Depending on the respective field of use, the materials have to satisfy various legal requirements in respect of their behaviour in the case of fire. To improve safety in the case of fire, these legal requirements have increasingly been made more demanding, in particular by the standard EN 45545 for the field of rail vehicles. It has been found that some composite sheets known from the prior art which still satisfy less demanding fire protection requirements can no longer satisfactorily meet the more demanding requirements. These composite sheets are therefore not allowed to be used for, in particular, applications in the field of rail traffic.

A flame-resistant fibre composite based on thermosets is, for example, known from the prior art of DE 10 2007 016698 A1.

BRIEF SUMMARY OF THE INVENTION

In view of this prior art, it is an object of the present invention to provide a fibre composite having good mechanical properties and very good smoke evolution in respect of the fire protection requirements of the standard EN 45545-2.

This object is achieved at least partly according to the invention by a fibre composite, having at least one fibre layer of a fibre material which is embedded in a matrix based on a thermoplastic when the composition of the matrix contains:

A) 60-95 parts by weight, preferably 65-90 parts by weight, particularly preferably 70-86 parts by weight, of aromatic polycarbonate and/or aromatic polyester carbonate,
B) from 0 to 15 parts by weight, preferably from 1 to 13 parts by weight, in particular from 1 to 7 parts by weight, of rubber-modified graft polymer,
C) one of the components C.1, C.2 or C.3, preferably C.3, having the composition and amount indicated in each case below:
   C.1) 1.0-14.5 parts by weight, preferably 1.5-9.0 parts by weight, more preferably 2.0-8.0 parts by weight, of at least one cyclic phosphazene of the structure (X),

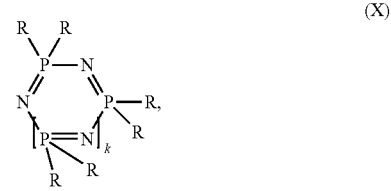

(X)

where
the radicals
R are identical or different and are each an amine radical, in each case optionally halogenated, preferably fluorinated, $C_1$- to $C_8$-alkyl, preferably methyl, ethyl, propyl or butyl, $C_1$- to $C_8$-alkoxy, preferably methoxy, ethoxy, propoxy or butoxy, $C_5$- to $C_6$-cycloalkyl in each case optionally substituted by alkyl, preferably $C_1$- to $C_4$-alkyl, and/or halogen, preferably chlorine and/or bromine, $C_6$- to $C_{20}$-aryloxy in each case optionally substituted by alkyl, preferably $C_1$- to $C_4$-alkyl, and/or halogen, preferably chlorine, bromine, and/or hydroxy, preferably phenoxy, naphthyloxy, $C_7$- to $C_{12}$-aralkyl in each case optionally substituted by alkyl, preferably $C_1$- to $C_4$-alkyl, and/or halogen, preferably chlorine and/or bromine, preferably phenyl-$C_1$- to $C_4$-alkyl, or a halogen radical, preferably chlorine, or an OH radical;
k is 1 or an integer from 1 to 10, preferably a number from 1 to 8, particularly preferably from 1 to 5; having a proportion of trimer (k=1) of from 50 to 98 mol %, preferably from 60 to 98 mol %, more preferably from 65 to 95 mol %, even more preferably 70-95 mol %, particularly preferably from 70 to 90 mol % and very particularly preferably 70-85 mol %, based on the component C.1,
C.2) from 0.1 to 30.0 parts by weight, preferably from 1.0 to 15.0 parts by weight, particularly preferably from 7.0 to 12.0 parts by weight, of a salt of a phosphinic acid,
C.3) from 0 to 25.0 parts by weight, preferably from 7.0 to 25.0 parts by weight, particularly preferably from 11 to 20.0 parts by weight, of an oligomeric phosphate, in particular a bisphenol A bis(diphenylphosphate),
D) from 0 to 30.0 parts by weight, preferably from 0 to 15.0 parts by weight, in particular from 0 to 5.0 parts by weight, of talc having an average particle size $d_{50}$ of from 0.1 to 20 μm, E) from 0.05 to 5.00 parts by weight, preferably from 0.1 to 3 parts by weight, particularly preferably from 0.1 to 1.5 parts by weight, in particular from 0.1 to 1 part by weight, of antidripping agent, where all parts by weight indicated in the present application are preferably normalized so that the sum of the parts by weight of all components A+B+C+D+E in the composition is 100.

In general, the composition of the matrix contains less than or equal to 15% by weight, preferably less than or equal to 10% by weight, of graft polymer B), based on the total composition. When the content of the component B) is less than or equal to 10% by weight, based on the total composition, the composition of the matrix preferably contains more than or equal to 11% by weight, based on the total composition, of flame retardant C.3. The composition of the matrix preferably contains up to 20% by weight, particularly preferably up to 17% by weight, in particular up to 15% by weight, based on the total composition, of flame retardant as per component C.3.

In a particularly preferred embodiment, the composition consists entirely of the components A to E, with the composition being able to additionally contain conventional additives.

Preferred fibre composites thus contain, as matrix material, compositions which do not contain any polyester.

In a preferred embodiment, the composition can additionally contain the following constituents:
F) 0-15.0 parts by weight, preferably 2.0-12.5 parts by weight, more preferably 3.0-9.0 parts by weight, particularly preferably 3.0-6.0 parts by weight, of vinyl (co) polymer or polyalkylene terephthalate,
G) 0-15.0 parts by weight, preferably 0.05-15.00 parts by weight, preferably 0.2-10.0 parts by weight, particularly preferably 0.4-5.0 parts by weight, of additives,
where all parts by weight indicated are preferably normalized so that the sum of the parts by weight of all components A+B+C+D+E+F+G in the composition is 100.

In a preferred embodiment, the composition is free of inorganic flame retardants and flame retardant synergists, in particular aluminium hydroxide, aluminium oxide hydroxide and also arsenic oxides and antimony oxides.

The preferred embodiments can be employed individually or linked to one another.

DETAILED DESCRIPTION OF THE INVENTION

Component A

Aromatic polycarbonates and/or aromatic polyester carbonates as per component A which are suitable for the purposes of the invention are known from the literature or can be prepared by processes known from the literature (for the preparation of aromatic polycarbonates, see, for example, Schnell, "Chemistry and Physics of Polycarbonates", Interacience Publishers, 1964 and also DE-B 1 495 626, DE-A 2 232 877, DE-A 2 703 376, DE-A 2 714 544, DE-A 3 000 610, DE-A 3 832 396; for the preparation of aromatic polyester carbonates, e.g. DE-A 3 007 934).

The preparation of aromatic polycarbonates is carried out, for example, by reacting diphenols with carbonic halides, preferably phosgene, and/or with aromatic dicarboxylic acid dihalides, preferably benzenedicarboxylic acid dihalides, by the phase boundary process, optionally using chain terminators, for example monophenols, and optionally using trifunctional or more than trifunctional branching agents, for example triphenols or tetraphenols. Preparation via a melt polymerization process by reacting diphenols with, for example, diphenyl carbonate is likewise possible.

Diphenols for preparing the aromatic polycarbonates and/or aromatic polyester carbonates are preferably those of the formula (I)

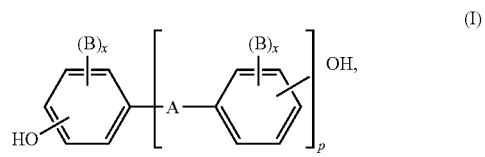

where
A is a single bond, $C_1$- to $C_5$-alkylene, $C_2$- to $C_5$-alkylidene, $C_5$- to $C_6$-cycloalkylidene, —O—, —SO—, —CO—, —S—, —SO_2—, $C_6$- to $C_{12}$-arylene, onto which further aromatic, optionally heteroatom-containing, rings can be fused,
or a radical of the formula (II) or (III)

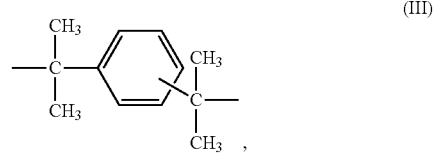

B is in each case $C_1$- to $C_{12}$-alkyl, preferably methyl, halogen, preferably chlorine and/or bromine,
the indices
x are each, independently of one another, 0, 1 or 2,
p is 1 or 0 and
$R^5$ and $R^6$ can be selected individually for each $X^1$ and are each, independently of one another, hydrogen or $C_1$- to $C_6$-alkyl, preferably hydrogen, methyl or ethyl,
$X^1$ is carbon and
m is an integer from 4 to 7, preferably 4 or 5, with the proviso that $R^5$ and $R^6$ are both alkyl on at least one atom $X^1$.

Preferred diphenols are hydroquinone, resorcinol, dihydroxydiphenols, bis(hydroxyphenyl)-$C_1$- to $C_5$-alkanes, bis(hydroxyphenyl)-$C_5$- to $C_6$-cycloalkanes, bis(hydroxyphenyl) ethers, bis(hydroxylphenyl) sulphoxides, bis(hydroxyphenyl) ketones, bis(hydroxyphenyl) sulphones and α,α-bis(hydroxy-phenyl)diisopropylbenzenes and also ring-brominated and/or ring-chlorinated derivatives.

Particularly preferred diphenols are 4,4'-dihydroxybiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, bis(4-hydroxyphenyl) sulphide, bis(4-hydroxyphenyl) sulphone and also dibrominated and tetrabrominated or chlorinated derivatives thereof, for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. Particular preference is given to 2,2-bis(4-hydroxyphenyl)propane (bisphenol A).

The diphenols can be used individually or as any mixtures. The diphenols are known from the literature or can be obtained by processes known from the literature.

Chain terminators suitable for the preparation of the thermoplastic, aromatic polycarbonates are, for example, phenol, p-chlorophenol, p-tert-butylphenol or 2,4,6-tribromophenol, and also long-chain alkylphenols such as 4-[2-(2,4,4-trimethylpentyl)]phenol, 4-(1,3-tetramethylbutyl)phenol as described in DE-A 2 842 005 or monoalkylphenols or dialkylphenols having a total of from 8 to 20 carbon atoms in the alkyl substituents, e.g. 3,5-di-tert-butylphenol, p-isooctylphenol, p-tert-octylphenol, p-dodecylphenol and 2-(3,5-dimethylheptyl)phenol and 4-(3,5-dimethylheptyl)phenol. The amount of chain terminators to be used is generally in the range from 0.5 mol % to 10 mol %, based on the total number of moles of the respective diphenols used.

The thermoplastic, aromatic polycarbonates have average molecular weights (weight average $M_w$, measured by GPC (gel permeation chromatography) using a polycarbonate standard) of from 15 000 to 80 000 g/mol, preferably from 19 000 to 32 000 g/mol, particularly preferably from 22 000 to 30 000 g/mol.

The thermoplastic, aromatic polycarbonates can be branched in a known way, preferably by incorporation of from 0.05 to 2.0 mol %, based on the sum of the diphenols used, of trifunctional or more than trifunctional compounds, for example those having three and more phenolic groups. Preference is given to using linear polycarbonates, more preferably those based on bisphenol A.

Both homopolycarbonates and copolycarbonates are suitable. To prepare copolycarbonates as per component A according to the invention, it is also possible to use from 1 to 25% by weight, preferably from 2.5 to 25% by weight, based on the total amount of diphenols to be used, of polydiorganosiloxanes having hydroxyaryloxy end groups. These are known (U.S. Pat. No. 3,419,634 A) and can be prepared by processes known from the literature. Polydiorganosiloxane-containing copolycarbonates are likewise suitable; the preparation of polydiorganosiloxane-containing copolycarbonates is described, for example, in DE-A 3 334 782.

Aromatic dicarboxylic acid dihalides for preparing aromatic polyester carbonates are preferably the diacid dichlorides of isophthalic acid, terephthalic acid, bis(4-carboxylphenyl) ether and naphthalene-2,6-dicarboxylic acid.

Particular preference is given to mixtures of the diacid dichlorides of isophthalic acid and terephthalic acid in a ratio of from 1:20 to 20:1.

In the preparation of polyester carbonates, a carbonic halide, preferably phosgene, is additionally concomitantly used as bifunctional acid derivative.

Possible chain terminators for the preparation of aromatic polyester carbonates are, apart from the monophenols mentioned above, the chlorocarbonic esters thereof and the acid chlorides of aromatic monocarboxylic acids which may optionally be substituted by $C_1$- to $C_{22}$-alkyl groups or by halogen atoms, and also aliphatic $C_2$- to $C_{22}$-monocarboxylic acid chlorides.

The amount of chain terminators is in each case from 0.1 to 10 mol %, based in the case of phenolic chain terminators on mole of diphenol and in the case of monocarboxylic acid chloride chain terminators on mole of dicarboxylic acid dichloride.

In the preparation of aromatic polyester carbonates, one or more aromatic hydroxycarboxylic acids can additionally be used.

The aromatic polyester carbonates can be either linear or branched in a known way (on the subject see DE-A 2 940 024 and DE-A 3 007 934), with linear polyester carbonates being preferred.

As branching agents, it is possible to use, for example, trifunctional or higher-functionality carboxylic acid chlorides such as trimesic acid trichloride, cyanuric acid trichloride, 3,3',4,4'-benzophenonetetracarboxylic acid tetrachloride, 1,4,5,8-naphthalenetetracarboxylic acid tetrachloride or pyromellitic acid tetrachloride, in amounts of from 0.01 to 1.0 mol % (based on dicarboxylic acid dichlorides used) or trifunctional or higher-functionality phenols such as phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]phenoxy)methane, 1,4-bis[4,4'-dihydroxytriphenyl)methyl]benzene, in amounts of from 0.01 to 1.0 mol %, based on diphenols used. Phenolic branching agents can be initially charged together with the diphenols; acid chloride branching agents can be introduced together with the acid dichlorides.

In the thermoplastic, aromatic polyester carbonates, the proportion of carbonate structural units can vary in any desired way. The proportion of carbonate groups is preferably up to 100 mol %, in particular up to 80 mol %, particularly preferably up to 50 mol %, based on the sum of ester groups and carbonate groups. Both the ester groups and the carbonate groups of the aromatic polyester carbonates can be present in the form of blocks or randomly distributed in the polycondensate.

The thermoplastic, aromatic polycarbonates and polyester carbonates can be used either alone or in any mixture.

Component B

The graft polymers B comprise, for example, graft polymers which have rubber-elastic properties and are obtainable essentially from at least 2 of the following monomers: chloroprene, 1,3-butadiene, isoprene, styrene, acrylonitrile, ethylene, propylene, vinyl acetate and (meth)acrylic esters having from 1 to 18 carbon atoms in the alcohol component; i.e. polymers as are described, for example, in "Methoden der Organischen Chemie" (Houben-Weyl), Vol. 14/1, Georg Thieme-Verlag, Stuttgart 1961, pp. 393-406 and in C. B. Bucknall, "Toughened Plastics", Appl. Science Publishers, London 1977.

Particularly preferred polymers B are, for example, ABS polymers (emulsion ABS, bulk ABS and suspension ABS), as are described, for example, in DE-A 2 035 390 (=U.S. Pat. No. 3,644,574) or in DE-A 2 248 242 (=GB patent 1 409 275) or in Ullmanns, Enzyklopädie der Techniachen Chemie, Vol. 19 (1980), p. 280 ff.

The graft copolymers B are prepared by free-radical polymerization, e.g. by emulsion, suspension, solution or bulk polymerization, preferably by emulsion or bulk polymerization.

Preferred polymers B are partially crosslinked and have gel contents (measured in toluene) above 20% by weight, preferably above 40% by weight, in particular above 60% by weight.

The gel content is determined at 25° C. in a suitable solvent (M. Hoffmann, H. Krömer, R. Kuhn, Polymeranalytik I and II, Georg Thieme-Verlag, Stuttgart 1977).

Preferred graft polymers B comprise graft polymers composed of:

B.1) from 5 to 95 parts by weight, preferably from 30 to 80 parts by weight, of a mixture of
B.1.1) from 50 to 95 parts by weight of styrene, α-methylstyrene, methyl-ring-substituted styrene, $C_1$- to $C_8$-alkyl methacrylate, in particular methyl methacrylate, $C_1$- to $C_8$-alkyl acrylate, in particular methyl acrylate, or mixtures of these compounds and
B.1.2) from 5 to 50 parts by weight of acrylonitrile, methacrylonitrile, $C_1$- to $C_8$-alkyl methacrylates, in particular methyl methacrylate, $C_1$- to $C_8$-alkyl acrylate, in particular methyl acrylate, maleic anhydride, $C_1$- to $C_4$-alkyl- or -phenyl-N-substituted maleimide or mixtures of these compounds on
B.2) from 5 to 95 parts by weight, preferably from 20 to 70 parts by weight, of a rubber-containing graft base.

The graft base preferably has a glass transition temperature below −10° C.

Glass transition temperatures are, unless indicated otherwise in the present invention, determined by means of dynamic differential calorimetry (DSC) in accordance with the standard DIN EN 61006 at a heating rate of 10 K/min, with definition of the Tg as midpoint temperature (tangent method) and nitrogen as protective gas.

Particular preference is given to a graft base based on a polybutadiene rubber.

Preferred graft polymers B are, for example, polybutadienes, butadiene-styrene copolymers and acrylate rubbers grafted with styrene and/or acrylonitrile and/or alkyl (meth)acrylates; i.e. copolymers of the type described in DE-A 1 694 173 (=U.S. Pat. No. 3,564,077); polybutadienes, butadiene-styrene or butadiene-acrylonitrile copolymers, polyisobutenes or polyisoprenes grafted with alkyl acrylates or methacrylates, vinyl acetate, acrylonitrile, styrene and/or alkyl styrenes, as are described, for example, in DE-A 2 348 377 (=U.S. Pat. No. 3,919,353).

Particularly preferred graft polymers B are graft polymers which are obtainable by a grafting reaction of
I. from 10 to 70% by weight, preferably from 15 to 50% by weight, in particular from 20 to 40% by weight, based on the graft product, of at least one (meth)acrylic ester or from 10 to 70% by weight, preferably from 15 to 50% by weight, in particular from 20 to 40% by weight, of a mixture of from 10 to 50% by weight, preferably from 20 to 35% by weight, based on the mixture, of acrylonitrile or (meth)acrylic esters and from 50 to 90% by weight, preferably from 65 to 80% by weight, based on the mixture, of styrene, on
II. from 30 to 90% by weight, preferably from 40 to 85% by weight, in particular from 50 to 80% by weight, based on the graft product, of a butadiene polymer having at least 50% by weight, based on II, of butadiene radicals as graft base.

According to the invention, very particular preference is given to using ABS (acrylonitrile-butadiene-styrene) as graft polymer.

The gel content of this graft base II is preferably at least 70% by weight (measured in toluene), the degree of grafting G is from 0.15 to 0.55 and the average particle diameter $d_{50}$ of the graft polymer B is from 0.05 to 2 μm, preferably from 0.1 to 0.6 μm.

(Meth)acrylic esters I are esters of acrylic acid or methacrylic acid and monohydric alcohols having from 1 to 18 carbon atoms. Particular preference is given to methyl methacrylate, ethyl methacrylate and propyl methacrylate.

The graft base II can comprise, in addition to butadiene radicals, up to 50% by weight, based on II, of radicals of other ethylenically unsaturated monomers such as styrene, acrylonitrile, esters of acrylic or methacrylic acid having from 1 to 4 carbon atoms in the alcohol component (e.g. methyl acrylate, ethyl acrylate, methyl methacrylate, ethyl methacrylate), vinyl esters and/or vinyl ethers. The preferred graft base II consists of pure polybutadiene.

Since it is known that the graft monomers are not necessarily grafted completely onto the graft base in the grafting reaction, graft polymers B also include, for the purposes of the invention, products which are obtained by polymerization of the graft monomers in the presence of the graft base.

The degree of grafting G is the weight ratio of grafted-on graft monomers to graft base and is dimensionless.

The average particle size $d_{50}$ is the diameter above and below which 50% by weight of the particles in each case lie. It can be determined by means of ultracentrifuge measurements (W. Scholtan, H. Lange, Kolloid, Z. und Z. Polymere 250 (1972), 782-796).

Further preferred graft polymers B are, for example, also graft polymers composed of
(a) from 20 to 90% by weight, based on B, of acrylate rubber as graft base and
(b) from 10 to 80% by weight, based on B, of at least one polymerizable, ethylenically unsaturated monomer the homopolymers or copolymers of which formed in the absence of a) would have a glass transition temperature above 25° C. as graft monomers.

The graft base composed of acrylate rubber preferably has a glass transition temperature below −20° C., preferably below −30° C.

The acrylate rubbers (a) of the polymers B are preferably polymers of alkyl acrylates, optionally with up to 40% by weight, based on (a), of other polymerizable, ethylenically unsaturated monomers. The preferred polymerizable acrylic esters include $C_1$- to $C_8$-alkyl esters, for example methyl, ethyl, n-butyl, n-octyl and 2-ethylhexyl esters and mixtures of these monomers.

To effect crosslinking, monomers having more than one polymerizable double bond can be copolymerized. Preferred examples of crosslinking monomers are esters of unsaturated monocarboxylic acids having from 3 to 8 carbon atoms and unsaturated monohydric alcohols having from 3 to 12 carbon atoms or saturated polyols having from 2 to 4 OH groups and from 2 to 20 carbon atoms, e.g. ethylene glycol dimethacrylate, allyl methacrylate, multiply unsaturated heterocyclic compounds, e.g. trivinyl cyanurate and triallyl cyanurate, polyfunctional vinyl compounds, e.g. divinylbenzenes and trivinylbenzenes, and also triallyl phosphate and diallyl phthalate. Preferred crosslinking monomers are the cyclic monomers triallyl cyanurate, triallyl isocyanurate, trivinyl cyanurate, triacryloylhexahydro-s-triazine, triallylbenzenes.

The amount of the crosslinking monomers is preferably from 0.02 to 5% by weight, in particular from 0.05 to 2% by weight, based on the graft base (a).

In the case of cyclic crosslinking monomers having at least 3 ethylenically unsaturated groups, it is advantageous to restrict the amount to below 1% by weight of the graft base (a).

Preferred "other" polymerizable, ethylenically unsaturated monomers which can, in addition to the acrylic esters, optionally be employed for preparing the graft base (a) are, for example, acrylonitrile, styrene, α-methylstyrene, acrylamides, vinyl $C_1$- to $C_6$-alkyl ethers, methyl methacrylate, butadiene. Preferred acrylate rubbers as graft base (a) are emulsion polymers which have a gel content of at least 60% by weight.

Further suitable graft bases are silicone rubbers having grafting-active positions and a gel content of at least 40% by weight (measured in dimethylformamide), as are described in the first patent publications DE 37 04 657, DE 37 04 655, DE 36 31 540 and DE 36 31 539, and also silicone-acrylate composite rubbers.

Component C.1

Phosphazenes as component C.1 which are used according to the present invention are cyclic phosphazenes of the formula (X)

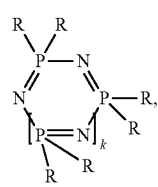

where the radicals

R are identical or different and are each an amine radical, in each case optionally halogenated, preferably fluorinated, more preferably monohalogenated, $C_1$-$C_8$-alkyl, preferably methyl, ethyl, propyl or butyl, $C_1$- to $C_8$-alkoxy, preferably methoxy, ethoxy, propoxy or butoxy, $C_5$- to $C_6$-cycloalkyl which is in each case optionally substituted by alkyl, preferably $C_1$- to $C_4$-alkyl, and/or halogen, preferably chlorine and/or bromine, $C_6$- to $C_{20}$-aryloxy, preferably phenoxy, naphthyloxy, which is in each case optionally substituted by alkyl, preferably $C_1$- to $C_4$-alkyl, and/or halogen, preferably chlorine, bromine, and/or hydroxy, $C_7$- to $C_{12}$-aralkyl, preferably phenyl-$C_1$- to $C_4$-alkyl, which is in each case optionally substituted by alkyl, preferably $C_1$- to $C_4$-alkyl, and/or halogen, preferably chlorine and/or bromine, or a halogen radical, preferably chlorine or fluorine, or an OH radical, k is 1 or an integer from 1 to 10, preferably a number from 1 to 8, particularly preferably from 1 to 5.

Preference is given to:

propoxyphosphazene, phenoxyphosphazene, methylphenoxyphosphazene, aminophosphazene and fluoroalkylphosphazenes and also phosphazenes having the following structures:

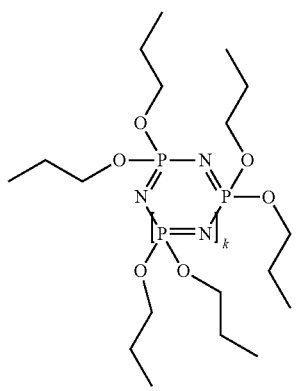

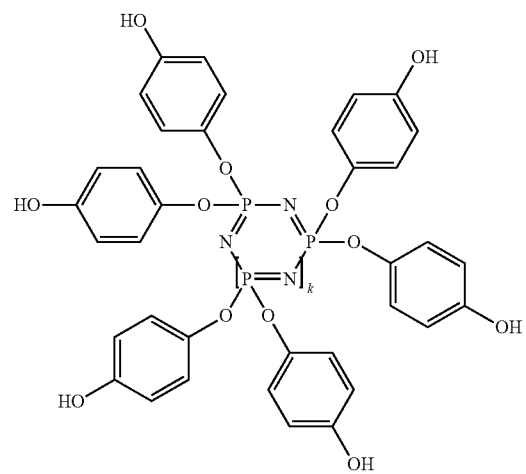

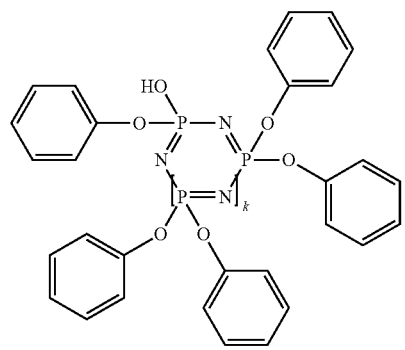

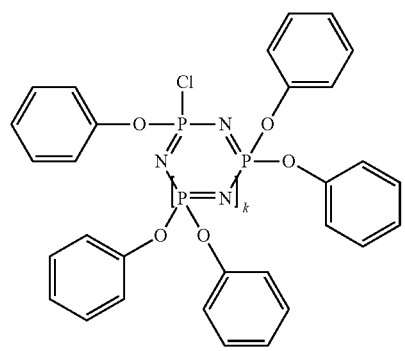

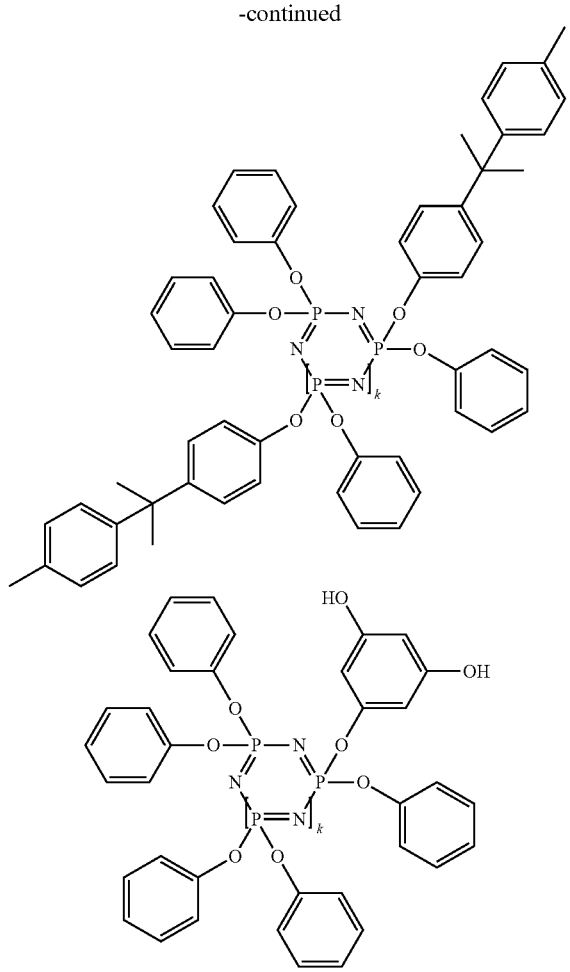

In the above compounds, k=1, 2 or 3.

Particular preference is given to phenoxyphosphazene (all radicals R=phenoxy) having a proportion of oligomers having k=1 (C.1-1) of from 50 to 98 mol %.

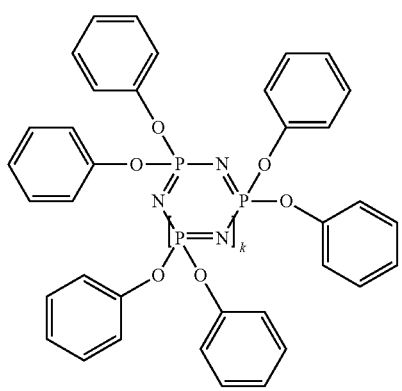
(XI)

The proportion of phosphazenes which are halogen-substituted on the phosphorus, e.g. from incompletely reacted starting material, is preferably less than 1000 ppm, more preferably less than 500 ppm.

The phosphazenes can be used either alone or as a mixture. The radical R can always be identical or 2 or more radicals in the formulae (Ia) and (Ib) can be different. The radicals R of a phosphazene are preferably identical.

In a further preferred embodiment, only phosphazenes having identical radicals R are used.

In a preferred embodiment, the proportion of tetramers (k=2) (C.1-2) is from 2 to 50 mol %, based on the component C.1, more preferably from 5 to 40 mol %, even more preferably from 10 to 30 mol %, particularly preferably from 10 to 20 mol %.

In a preferred embodiment, the proportion of the higher oligomeric phosphazenes (k=3, 4, 5, 6 and 7) (C.1-3) is from 0 to 30 mol %, based on the component C, more preferably from 2.5 to 25 mol %, even more preferably from 5 to 20 mol % and particularly preferably 6-15 mol %.

In a preferred embodiment, the proportion of oligomers having k≥8 (C.1-4) is from 0 to 2.0 mol %, based on the component C.1, and preferably from 0.10 to 1.00 mol %.

In a further preferred embodiment, the phosphazenes of the component C.1 meet all three abovementioned conditions in respect of the proportions (C.1-2-C.1-4).

The component C.1 is preferably a phenoxyphosphazene having a proportion of trimer (k=1) of from 70 to 85 mol %, a proportion of tetramer (k=2) of from 10 to 20 mol %, a proportion of higher oligomeric phosphazenes (k=3, 4, 5, 6 and 7) of from 6 to 15 mol % and phosphazene oligomers having k≥8 of from 0.1 to 1 mol %, based on the component C.1.

In an alternative embodiment, n, defined as the weighted arithmetic value of k, is in the range from 1.10 to 1.75, preferably from 1.15 to 1.50, more preferably from 1.20 to 1.45 and particularly preferably from 1.20 to 1.40 (range boundaries included).

$$n = \frac{\sum_{i=1}^{max} k_i \cdot x_i}{\sum_{i=1}^{max} x_i}$$

The phosphazenes and the preparation thereof are described, for example, in EP-A 728 811, DE-A 1 961668 and WO 97/40092 A1.

The oligomer compositions in the respective blend samples can, after compounding too, be detected and quantified by means of $^{31}$P-NMR (chemical shift; δ for trimer from 6.5 to 10.0 ppm; δ for tetramer: from −10 to −13.5 ppm; δ for higher oligomers: from −16.5 to −25.0 ppm).

Component C.2

For the purposes of the invention, a salt of a phosphinic acid (component C.2) is the salt of a phosphinic acid with any metal cation. It is also possible to use mixtures of salts which differ in respect of their metal cation. The metal cations are the cations of the metals of the 1$^{st}$ main group (alkali metals, preferably Li$^+$, Na$^+$, K$^+$), the 2$^{nd}$ main group (alkaline earth metals; preferably Mg$^{2+}$, Ca$^{2+}$, Sr$^{2+}$, Ba$^{2+}$, particularly preferably Ca$^{2+}$) or the 3$^{rd}$ main group (elements of the boron group; preferably Al$^{3+}$) and/or the 2$^{nd}$, 7$^{th}$ or 8$^{th}$ transition group (preferably Zn$^{2+}$, Mn$^{2+}$, Fe$^{2+}$, Fe$^{3+}$) of the Periodic Table.

Preference is given to using a salt or a mixture of salts of a phosphinic acid of the formula (IV),

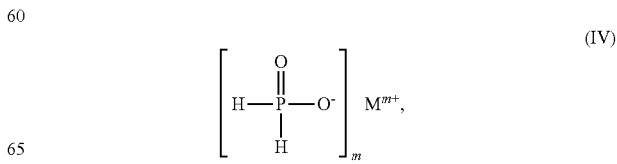
(IV)

where $M^{m+}$ is a metal cation of the $1^{st}$ main group (alkali metals; m=1), $2^{nd}$ main group (alkaline earth metals; m=2) or the $3^{rd}$ main group (m=3) or the $2^{nd}$, $7^{th}$ or $8^{th}$ transition group (where m is an integer from 1 to 6, preferably from 1 to 3 and particularly preferably 2 or 3) of the Periodic Table.

In formula (IV), particular preference is given to
for m=1, the metal cations $M^+=Li^+$, $Na^+$, $K^+$,
for m=2, the metal cations $M^{2+}=Mg^{2+}$, $Ca^{2+}$, $Sr^{2+}$, $Ba^{2+}$ and
for m=3, the metal cations $M^{3+}=Al^{3+}$,
with greatest preference being given to $Ca^{2+}$ (m=2) and $Al^{3+}$ (m=3).

In a preferred embodiment, the average particle size $d_{50}$ of the phosphinic acid salt (component C.2) is below 80 µm, preferably below 60 µm, with particular preference being given to $d_{50}$ being in the range from 10 µm to 55 µm. The average particle size $d_{50}$ is the diameter above and below which 50% by weight of the particles lie in each case. It is also possible to use mixtures of salts which differ in terms of their average particle size $d_{50}$.

These requirements imposed on the particle size $d_{50}$ of the phosphinic acid salt are each associated with the technical effect that the flame retardant efficiency of the phosphinic acid salt is increased.

The phosphinic acid salt can be used either alone or in combination with other phosphorus-containing flame retardants. Preference is given to phosphinic acid salt-containing compositions which are free of phosphorus-containing flame retardants selected from the group consisting of monomeric and oligomeric phosphoric and phosphonic esters, phosphonatamines and phosphazenes. These other phosphorus-containing flame retardants, for example the monomeric and oligomeric phosphoric and phosphonic esters, have the disadvantage compared to the phosphinic acid salts that they reduce the thermal shape stability of the moulding compositions.

Component C.3

As flame retardants for component C.3, use is made of oligomeric phosphoric or phosphonic esters of the general formula (VIII)

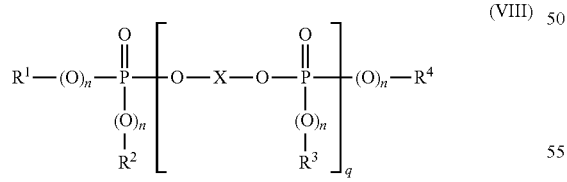
(VIII)

where
$R^1$, $R^2$, $R^3$ and $R^4$ are each, independently of one another, optionally halogenated $C_1$- to $C_8$-alkyl or $C_5$- to $C_6$-cycloalkyl, $C_6$- to $C_{20}$-aryl or $C_7$- to $C_{12}$-aralkyl which is in each case optionally substituted by alkyl, preferably $C_1$- to $C_4$-alkyl, and/or halogen, preferably chlorine, bromine, the indices
n are, independently of one another, 0 or 1,
q is from 0 to 30 and X is a monocyclic or polycyclic aromatic radical having from 6 to 30 carbon atoms or a linear or branched aliphatic radical having from 2 to 30 carbon atoms which can be OH-substituted and contain up to 8 ether bonds.

$R^1$, $R^2$, $R^3$ and $R^4$ are, independently of one another, preferably $C_1$- to $C_4$-alkyl, phenyl, naphthyl or phenyl-$C_1$- to $C_4$-alkyl. The aromatic groups $R^1$, $R^2$, $R^3$ and $R^4$ can be substituted by halogen and/or alkyl groups, preferably chlorine, bromine and/or $C_1$- to $C_4$-alkyl. Particularly preferred aryl radicals are cresyl, phenyl, xylenyl, propylphenyl or butylphenyl and also the corresponding brominated and chlorinated derivatives thereof.

X in the formula (VIII) is preferably a monocyclic or polycyclic aromatic radical having from 6 to 30 carbon atoms. This is preferably derived from diphenols of the formula (I).

The indices n in the formula (VIII) can, independently of one another, each be 0 or 1, with preference being given to n being 1.

q is in the range from 0 to 30, preferably from 0.3 to 20, particularly preferably from 0.5 to 10, in particular from 0.5 to 6, even more preferably from 1.01 to 1.6, very particularly preferably from 1.05 to 1.6, most preferably from 1.05 to 1.2.

X is particularly preferably

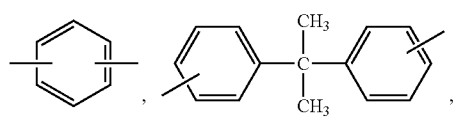

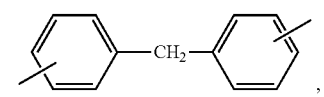

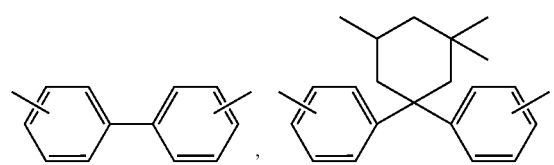

or chlorinated or brominated derivatives thereof. In particular, X is derived from resorcinol, hydroquinone, bisphenol A or diphenylphenol. X is particularly preferably derived from bisphenol A.

As component C.3 according to the invention, it is also possible to use mixtures of various phosphates.

Phosphorus compounds of the formula (VIII) are, in particular, resorcinol-bridged oligophosphate and bisphenol A-bridged oligophosphate. The use of oligomeric phosphoric esters of the formula (VIII) which are derived from bisphenol A is particularly preferred.

Greatest preference is given to bisphenol A-based oligophosphate of the formula (VIIIa),

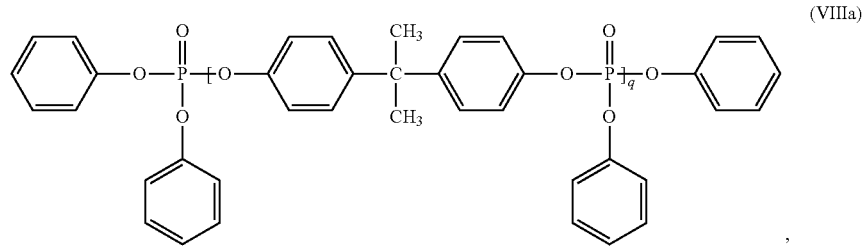

(VIIIa)

where q in formula (VIIIa) is from 1.05 to 1.2, as component C.3.

The phosphorus compounds of component C.3 are known (cf., for example, EP-A 0 363 608, EP-A 0 640 655) or can be prepared in an analogous way by known methods (e.g. Ullmanns Enzyklopädie der technischen Chemie, Vol. 18, p. 301 ff. 1979; Houben-Weyl, Methoden der organischen Chemie, Vol. 12/1, p. 43; Beilstein Vol. 6, p. 177).

When mixtures of various phosphorus compounds are used and in the case of oligomeric phosphorus compounds, the q value indicated is the average q value. The average q value can be determined by determining the composition of the phosphorus compound (molecular weight distribution) by means of a suitable method (gas chromatography (GC), high pressure liquid chromatography (HPLC), gel permeation chromatography (GPC)) and calculating the average values of q therefrom.

The flame retardants can be used either alone or in any mixture with one another or in admixture with other flame retardants. However, preference is given to no further flame retardants apart from the flame retardants of the group C.1, C.2 and/or C.3 used.

Component D

For the purposes of the present invention, talc is a naturally occurring or synthetically produced talc.

Pure talc has the chemical composition $3MgO.4SiO_2.H_2O$ and thus an MgO content of 31.9% by weight, an $SiO_2$ content of 63.4% by weight and a content of chemically bound water of 4.8% by weight. It is a silicate having a sheet structure.

Naturally occurring talc materials generally do not have the above-described ideal composition since they are contaminated by partial replacement of the magnesium by other elements, by partial replacement of silicon by, for example, aluminium and/or by growing together with other minerals, e.g. dolomite, magnesite and chlorite.

The specific types of talc for the purposes of the invention have a particularly high purity, characterized by an MgO content of from 28 to 35% by weight, preferably from 30 to 33% by weight, particularly preferably from 30.5 to 32% by weight, and an $SiO_2$ content of from 55 to 65% by weight, preferably from 58 to 64% by weight, particularly preferably from 60 to 62.5% by weight. Preferred types of talc have, furthermore, an $Al_2O_3$ content of less than 5% by weight, particularly preferably less than 1% by weight, in particular less than 0.7% by weight.

A commercially available type of talc which corresponds to this definition is, for example, Luzenac® A3 from Luzenac Naintsch Mineralwerke GmbH (Graz, Austria).

Types of talc which are not according to the invention are, for example, Luzenac SE-Standard, Luzenac SE-Super, Luzenac SE-Micro and also Luzenac ST 10, 15, 20, 30 and 60, which are all marketed by Luzenac Naintsch Mineralwerke GmbH.

The use of the talc according to the invention in the form of finely milled types having an average particle size $d_{50}$ of from 0.1 to 20 µm, preferably from 0.2 to 10 µm, particularly preferably from 1.1 to 5 µm, very particularly preferably from 1.15 to 2.5 µm, is particularly advantageous.

The talc can have been surface-treated, e.g. silanized, in order to give better compatibility with the polymer. With a view to processing and production of the moulding compositions, the use of compacted talc is also advantageous.

Component E

In particular, polytetrafluoroethylene (PTFE) or a PTFE-containing composition, for example masterbatches of PTFE with styrene or methyl methacrylate-containing polymers or copolymers, either as powder or as coagulated mixture, e.g. together with component B, is used as antidripping agent.

The fluorinated polyolefins used as antidripping agents have a high molecular weight and glass transition temperatures above −30° C., generally above 100° C., fluorine contents of preferably from 65 to 76% by weight, in particular from 70 to 76% by weight, average particle diameters $d_{50}$ of from 0.05 to 1000 µm, preferably from 0.08 to 20 µm. In general, the fluorinated polyolefins have a density of from 1.2 to 2.3 g/cm³. Preferred fluorinated polyolefins are polytetrafluoroethylene, polyvinylidene fluoride, tetrafluoroethylene-hexafluoropropylene and ethylene-tetrafluoroethylene copolymers. The fluorinated polyolefins are known (cf. "Vinyl and Related Polymers" by Schildknecht, John Wiley & Sons, Inc., New York, 1962, pages 484-494; "Fluoropolymers" by Wall, Wiley-Interscience, John Wiley & Sons, Inc., New York, Volume 13, 1970, pages 623-654; "Modern Plastics Encyclopedia", 1970-1971, Volume 47, No. 10 A, October 1970, McGraw-Hill, Inc., New York, pages 134 and 774; "Modern Plastics Encyclopedia", 1975-1976, October 1975, Volume 52, No. 10 A, McGraw-Hill, Inc., New York, pages 27, 28 and 472 and U.S. Pat. Nos. 3,671,487, 3,723, 373 and 3,838,092).

They can be prepared by known methods, for example by polymerization of tetrafluoroethylene in an aqueous medium using a free-radical-forming catalyst, for example sodium, potassium or ammonium peroxodisulphate at pressures of from 7 to 71 kg/cm² and temperatures of from 0 to 200° C., preferably at temperatures of from 20 to 100° C. (For further details, see, for example, U.S. Pat. No. 2,393,967). Depending on the form used, the density of these materials can be in the range from 1.2 to 2.3 g/cm³, and the average particle size can be in the range from 0.05 to 1000 µm.

The fluorinated polyolefins which are preferred according to the invention have average particle diameters of from 0.05 to 20 µm, preferably from 0.08 to 10 µm, and a density of from 1.2 to 1.9 g/cm³.

Suitable fluorinated polyolefins E which can be used in powder form are tetrafluoroethylene polymers having average particle diameters of from 100 to 1000 µm and densities of from 2.0 g/cm³ to 2.3 g/cm³. Suitable tetrafluoroethylene polymer powders are commercial products and are sold, for example, by DuPont under the trade name Teflon®.

Particularly preferred flame-retarded compositions contain, as component E, a fluorinated polyolefin in an amount of from 0.05 to 5.0 parts by weight, preferably from 0.1 to 2.0 parts by weight, particularly preferably from 0.3 to 1.0 part by weight, in addition to optional further additives.

Component F

Component F comprises one or more thermoplastic vinyl (co)polymers or polyalkylene terephthalates. Suitable vinyl (co)polymers F are polymers of at least one monomer from the group consisting of vinylaromatics, vinyl cyanides (unsaturated nitriles), ($C_1$- to $C_8$)-alkyl (meth)acrylates, unsaturated carboxylic acids and derivatives (e.g. anhydrides and imides) of unsaturated carboxylic acids. Particularly suitable polymers are (co)polymers of F.1 from 50 to 99 parts by weight, preferably from 60 to 80 parts by weight, of vinylaromatics and/or ring-substituted vinylaromatics, e.g. styrene, α-methylstyrene, p-methylstyrene, p-chlorostyrene and/or ($C_1$- to $C_8$)-alkyl (meth)acrylate such as methyl methacrylate, ethyl methacrylate, and F.2 from 1 to 50 parts by weight, preferably from 20 to 40 parts by weight, of vinyl cyanides (unsaturated nitriles) such as acrylonitrile and methacrylonitrile and/or ($C_1$- to $C_8$)-alkyl (meth)acrylates such as methyl methacrylate, n-butyl acrylate, t-butyl acrylate, and/or unsaturated carboxylic acids such as maleic acid and/or derivatives such as anhydrides and imides, unsaturated carboxylic acids, for example maleic anhydride and N-phenylmaleimide.

The vinyl (co)polymers F are resin-like, thermoplastic and rubber-free. Particular preference is given to the copolymer of F.1 styrene and F.2 acrylonitrile.

The (co)polymers as per F are known and can be prepared by free-radical polymerization, in particular by emulsion, suspension, solution or bulk polymerization. The (co)polymers preferably have average molecular weights $M_w$ (weight average, determined by light scattering or sedimentation) in the range from 15 000 to 200 000 g/mol, particularly preferably from 100 000 to 150 000 g/mol.

In a particularly preferred embodiment, F is a copolymer of 77% by weight of styrene and 23% by weight of acrylonitrile having a weight average molecular weight $M_w$ of 130 000 g/mol.

Likewise, the compositions can, according to the invention, contain a polyalkylene terephthalate or a mixture of two or more different polyalkylene terephthalates as suitable component F.

For the purposes of the invention, polyalkylene terephthalates are polyalkylene terephthalates which are derived from terephthalic acid (or its reactive derivatives, e.g. dimethyl esters or anhydrides) and alkanediols, cycloaliphatic or araliphatic diols and mixtures thereof, for example on the basis of propylene glycol, butanediol, pentanediol, hexanediol, 1,2-cyclohexanediol, 1,4-cyclohexanediol, 1,3-cyclohexanediol and cyclohexyldimethanol, with the diol component according to the invention having more than 2 carbon atoms. Accordingly, preference is given to using polybutylene terephthalate and/or polytrimethylene terephthalate, most preferably polybutylene terephthalate, as component F.

The polyalkylene terephthalates according to the invention can also contain up to 5% by weight of isophthalic acid as monomer of the diacid.

Preferred polyalkylene terephthalates can be prepared by known methods from terephthalic acid (or its reactive derivatives) and aliphatic or cycloaliphatic diols having from 3 to 21 carbon atoms (Kunststoff-Handbuch, Vol. VIII, p. 695 ff, Karl-Hanser-Verlag, Munich 1973).

Preferred polyalkylene terephthalates contain at least 80 mol %, preferably at least 90 mol %, based on the diol component, of 1,3-propanediol and/or 1,4-butanediol radicals.

The preferred polyalkylene terephthalates can contain up to 20 mol % of radicals of other aromatic dicarboxylic acids having from 8 to 14 carbon atoms or aliphatic dicarboxylic acids having from 4 to 12 carbon atoms, e.g. radicals of phthalic acid, isophthalic acid, naphthalene-2,6-dicarboxylic acid, biphenyl-4,4'-dicarboxylic acid, succinic acid, adipic acid, sebacic acid, azelaic acid, cyclohexanediacetic acid, cyclohexanedicarboxylic acid, in addition to terephthalic acid radicals.

The preferred polyalkylene terephthalates can contain, in addition to 1,3-propanediol or 1,4-butanediol radicals, up to 20 mol % of other aliphatic diols having from 3 to 12 carbon atoms or cycloaliphatic diols having from 6 to 21 carbon atoms, e.g. radicals of 1,3-propanediol, 2-ethyl-1,3-propanediol, neopentyl glycol, 1,5-pentanediol, 1,6-hexanediol, cyclohexane-1,4-dimethanol, 3-methyl-2,4-pentanediol, 2-methyl-2,4-pentanediol, 2,2,4-trimethyl-1,3-pentanediol and 2-ethyl-1,6-hexanediol, 2,2-diethyl-1,3-propanediol, 2,5-hexanediol, 1,4-di(ß-hydroxyethoxy)benzene, 2,2-bis(4-hydroxycyclohexyl)propane, 2,4-dihydroxy-1,1,3,3-tetramethylcyclobutane, 2,2-bis(3-ß-hydroxyethoxyphenyl)propane and 2,2-bis(4-hydroxypropoxyphenyl)propane (DE-A 24 07 674, 24 07 776, 27 15 932).

The polyalkylene terephthalates can be branched by incorporation of relatively small amounts of 3- or 4-hydric alcohols or 3- or 4-basic carboxylic acids, as described in DE-A 1900270 and U.S. Pat. No. 3,692,744. Examples of preferred branching agents are trimesic acid, trimellitic acid, trimethylolethane and trimethylolpropane and pentaerythritol.

It is advisable to use not more than 1 mol % of the branching agent, based on the acid component.

Particular preference is given to polyalkylene terephthalates which have been prepared solely from terephthalic acid or reactive derivatives thereof (e.g. dialkyl esters thereof such as dimethyl terephthalate) and 1,3-propanediol and/or 1,4-butanediol (polypropylene terephthalate and polybutylene terephthalate), and mixtures of these polyalkylene terephthalates.

Preferred polyalkylene terephthalates also include copolyesters which have been prepared from two of the abovementioned acid components and/or from at least two of the abovementioned alcohol components; particularly preferred copolyesters are poly(1,3-propylene glycol/1,4-butanediol) terephthalates.

The polyalkylene terephthalates generally have an intrinsic viscosity of from about 0.4 to 1.5 dl/g, preferably from 0.5 to 1.3 dl/g, in each case measured in phenol/o-dichlorobenzene (1:1 parts by weight) at 25° C.

In an alternative embodiment, the polyesters prepared according to the invention can also be used in admixture with other polyesters and/or further polymers, with preference being given to using mixtures of polyalkylene terephthalates with other polyesters.

Further Additives G

The composition can contain further customary polymer additives such as flame retardant synergists, lubricants and mould release agents (for example pentaerythrityl tetrastearate), nucleating agents, stabilizers (for example UV/light stabilizers, heat stabilizers, antioxidants, transesterification inhibitors, hydrolysis inhibitors), antistatics (for example conductive carbon blacks, carbon fibres, carbon nanotubes and organic antistatics such as polyalkylene ethers, alkylsulphonates or polyamide-containing polymers), and also dyes, pigments, fillers and reinforcing materials, in particular glass fibres, mineral reinforcing materials and carbon fibres. Furthermore, the compositions can contain inorganic boron compounds, preferably metal salts of borates, in particular zinc borate.

As stabilizers, preference is given to using sterically hindered phenols and phosphites or mixtures thereof, for example Irganox© B900 (Ciba Speciality Chemicals). Pentaerythrityl tetrastearate is preferably used as mould release agent. Furthermore, carbon black is preferably added as black pigment (e.g. Black Pearls).

Particularly preferred moulding compositions comprise, as component G, from 0.1 to 1.5 parts by weight, preferably from 0.2 to 1.0 part by weight, particularly preferably from 0.3 to 0.8 part by weight, of a mould release agent, particularly preferably pentaerythrityl tetrastearate, in addition to optional further additives.

Particularly preferred moulding compositions contain, as component G, at least one stabilizer, for example selected from the group consisting of sterically hindered phenols, phosphites and mixtures thereof and particularly preferably Irganox® B900, in an amount of from 0.01 to 0.5 part by weight, preferably from 0.03 to 0.4 part by weight, particularly preferably from 0.06 to 0.3 part by weight, in addition to optional further additives.

Furthermore, the combination of PTFE (component E), pentaerythrityl tetrastearate and Irganox B900 with a phosphorus-based flame retardant as component C) is particularly preferred.

Very particularly preferred compositions for fibre composites according to the invention consist entirely of the components A to E and optionally at least one mould release agent, in particular pentaerythrityl tetrastearate, and optionally at least one stabilizer, in particular a phenol, a phosphite or mixtures thereof.

It has been found that the composition according to the invention used as matrix material for impregnating the fibres makes it possible to provide a fibre composite which not only has good mechanical properties in respect of strength and stiffness but also meets stringent fire protection requirements in terms of smoke evolution (Ds(4), VOF 4 and Ds(max)) in accordance with EN 45545-2 for fire protection in rail vehicles.

The concept of the invention thus also includes the use of the above-described compositions for producing fibre composites which meet the requirements of EN 45545-2 in respect of smoke evolution, in particular for the production of components for rail vehicles.

Furthermore, components produced from a fibre composite according to the invention have good properties in respect of flame spread (CFE) and heat release (MARHE) in accordance with the requirements of EN 45545.

The fibre composite has at least one fibre layer composed of a fibre material. For the purposes of the present invention, such a fibre layer is a sheet-like layer which is formed by fibres arranged essentially in a plane. The fibres can be joined to one another through their position, for example by means of a weave-like arrangement of the fibres. Furthermore, the fibre layer can also comprise a proportion of resin or another adhesive in order to join the fibres to one another. Alternatively, the fibres can also not be joined to one another. This means that the fibres can be detached from one another without application of an appreciable force. The fibre layer can also have a combination of fibres joined to one another and fibres which are not joined to one another.

The at least one fibre layer is embedded in a matrix based on a thermoplastic. This means that the fibre layer is surrounded on at least one side, preferably both sides, by a thermoplastic. The periphery of the matrix composed of the thermoplastic forms, in particular, the outer surface of the component or semifinished part consisting of the fibre composite.

The number of fibre layers in the fibre composite is in principle not subject to any limitations. It is therefore also possible for two or more fibre layers to be arranged on top of one another. Two superposed fibre layers can in each case be embedded individually in the matrix, so that they are each surrounded on both sides by the matrix. Furthermore, two or more fibre layers can also lie directly on top of one another, so that their totality is surrounded by the matrix. In this case, these two or more fibre layers can also be regarded as a thick fibre layer.

In an embodiment of the fibre composite, the fibre layer is configured as unidirectional fibre layer, as woven layer or laid web, as knitted fabric, crocheted fabric or braid, or as long fibres in the form of tangled fibre mats or nonwovens or as a combination thereof. In experiments, the best properties of the fibre composites were achieved using unidirectional fibre layers, woven layers and laid web.

The chemical structure of the fibres (reinforcing fibres) of the fibre material can be of a variety of types. The reinforcing fibres preferably have a higher softening or melting point than the respective thermoplastic matrix present. Examples of fibre materials are inorganic materials such as siliceous and nonsiliceous glasses of various types, carbon, basalt, boron, silicon carbide, metals, metal alloys, metal oxides, metal nitrides, metal carbides and silicates and also organic materials such as natural and synthetic polymers, for example polyacrylonitriles, polyesters, ultrahighly oriented polyolefin fibres, polyamides, polyimides, aramids, liquid crystal polymers, polyphenylene sulphides, polyether ketones, polyether ether ketones, polyetherimides, cotton and cellulose. Preference is given to high-melting materials, for example glasses, carbon, aramids, basalt, liquid crystal polymers, polyphenylene sulphides, polyether ketones, polyether ether ketones and polyetherimides. Particularly preferred reinforcing fibres are glass fibres and carbon fibres.

In an embodiment of the fibre composite, the volume content of the fibre material based on the total volume of the fibre composite is in the range from 30 to 60% by volume, preferably in the range from 40 to 55% by volume.

In an embodiment of the fibre composite, the fibre composite is in the form of a fibre composite sheet. The present disclosure accordingly also provides, in particular, a fibre composite sheet which consists essentially of the above-described fibre composite.

In an embodiment of the fibre composite, the fibre composite sheet has a thickness in the range from 0.5 to 3 mm, preferably from 1 to 2 mm. Particularly good fire properties have been found at these thicknesses.

In an embodiment of the fibre composite, the fibre composite has the following properties, in particular when the fibre composite is in the form of a fibre composite sheet:

Ds(4) in accordance with ISO 5659-2: <300,
VOF 4 in accordance with ISO 5659-2: <600 and
Ds(max) in accordance with ISO 5659-2: <600.

The values Ds(4), VOF 4, Ds(max) for smoke evolution in accordance with ISO 5659-2 are to be determined at an irradiation intensity of 50 kW/m$^2$ and without an ignition flame (see example).

Various production methods can be used for producing thermoplastic semifinished parts reinforced with continuous fibres (composite sheets). Here, a fundamental distinction can firstly be made in terms of whether the composite sheet consists, for example, of unidirectional fibre layers, woven layers, tangled fibre layers or combinations thereof, with unidirectional fibres being able to be introduced into the composite sheet either in the form of a semifinished part (e.g. laid web) or directly as pure fibre roving. In the case of the latter approach, the fibre rovings are generally firstly impregnated in a single layer with the thermoplastic resin and are subsequently pressed to form a multilayer system (laminate), with there being various impregnation methods. If the composite sheet is produced from semifinished parts (woven layers, laid web, tangled fibres, etc.), the prior art likewise discloses various possibilities for bringing the fibre and matrix together. Customary methods are, for example, the process using powder prepregs or the film stacking process. The film stacking process can preferably be used for producing the above-described fibre composites. Here, films and woven layers are placed alternately on one another, with the weight per unit area of the woven layer and thickness of the films being able to be, for example, matched so that a fibre volume content of, for example, 50% by volume results in the finished composite sheet.

The above-described object is also achieved, according to the invention, at least partially by the use of one of the above-described fibre composites for a component for a rail vehicle, in particular for a rail vehicle for transporting passengers.

It has been found that the above-described fibre composites display good results in respect of the properties in the case of fire which are important for rail vehicles. These fibre composites are therefore particularly suitable for use in rail vehicles. In particular, these fibre composites are suitable for use in rail vehicles for transporting passengers since fire protection is particularly important for the safety of the passengers and the demands which materials used in such rail vehicles have to meet are correspondingly high. The smoke evolution set down in the rail standard as per EN 45545-2 is a substantial hurdle for thermoplastics.

It has been found that the above-described fibre composite displays very low smoke evolution and satisfies the smoke evolution requirements of EN 45545-2. The fibre composite is therefore also particularly suitable for components which have to satisfy these requirements, for example structural and lining elements of the vehicle interior (walls, ceiling linings, doors, windows, etc.), luggage racks, driver's cabin, tables, acoustic and heat insulation materials, vertical surfaces of the outer skin of the vehicle, outer surfaces of the substructure, light covers, light diffusers, etc. Fibre composites of the present invention can also be used for producing thin-walled mouldings (e.g. data technology housing parts, TV housings, notebooks) where the materials used have to meet particularly demanding requirements in terms of notched impact toughness, joint line strength, flame resistance and surface quality, also for producing housing parts, e.g. for household appliances, office machines such as monitors or printers, or covering plates for the building sector and parts for the motor vehicle sector or parts for the electrical sector.

The above-described object is also at least partially achieved by a process for producing the above-described fibre composite, in which a layer structure made up of superposed layers is formed from at least one fibre layer of a fibre material and from polymer layers composed of at least one polymer film arranged on both sides of the fibre layer and in which the layer structure is pressed under applied pressure and the action of heat to form a fibre composite, where the polymer film has a composition corresponding to the matrix of the above-described fibre composite. This process can also be referred to as "film stacking" process.

In the "film stacking process" a layer structure of superposed layers is formed from at least one fibre layer composed of a fibre material and from polymer layers which are composed of at least one polymer film and are arranged on both sides of the fibre layer. For this purpose, for example, one or more band-like fibre layers and also band-like polymer films can be wound off reels of a rolling-off station and placed together in accordance with the intended arrangement to form a layer structure. For example, a layer structure having two fibre layers and three polymer layers can be produced, with the various layers being arranged alternately on top of one another.

In the process, the layer structure is pressed under applied pressure and the action of heat to form a fibre composite. This process step can be carried out continuously, semicontinuously or discontinuously. For example, in the case of a continuous process, it is possible to use a heatable belt press, for a semicontinuous process it is possible to use an interval heating press or for a discontinuous process it is possible to use a simple heat press. The continuous or semicontinuous mode of operation makes it possible to achieve higher throughputs compared to the discontinuous process.

Further processes for producing the above-described fibre composite are described below:

For producing the above-described fibre composites (composite sheets) based on the prepreg technology, it is possible to use a multistage process having the following process steps:

milling of one or more granular material(s) having the desired composition of the matrix to powder,
sieving of the powders,
production of the powder prepregs,
pressing of the powder prepregs to give composite sheets.

The term prepreg for composite sheets refers to a semifinished fibre part (e.g. woven layer, laid web, nonwoven, or the like) which has been preimpregnated with thermoplastic matrix material and can be draped.

The milling of the granular material to powder is carried out using suitable mills. Pin mills or vibrational mills, for example, are frequently used for this purpose. Depending on the type of mill, various comminution mechanisms can dominate in the process, with the polymer usually being broken up by friction or impact stress. Technical thermoplastics are generally used for producing fibre-reinforced semifinished parts (composite sheets). Many of these technical thermoplastics (e.g. PA, PP, PC, PET, PEEK, PPS) display very ductile behaviour even under impact stress, which results in the materials bending instead of breaking in the milling process or even being able to melt due to evolution of heat. Such polymers sometimes have to be cooled to temperatures below $-196°$ C. by means of liquid nitrogen or $CO_2$ during milling in order to undergo brittle fracture during milling. This additional cooling step is associated with high (energy) costs in the total process and impairs the economics tremendously.

To produce powder prepregs for composite sheets as per the prior art, powders having particular particle size ranges have to be used. For this purpose, the powder produced is classified by means of various sieves in a step following milling. Preferred ranges both from the point of view of process yield and also in terms of suitability for processing are from 200 μm to 500 μm.

The thermoplastic is subsequently applied in powder form to a woven fibre layer, fibre laid web, fibre nonwoven or the like and melted by supply of heat. Subsequent cooling results in adhesion of the polymer to the fibre and the composite ("prepreg") can be rolled up and processed further later.

The amount of powder sprinkled onto the woven fibre layer is determined by means of a metering device. This ultimately determines the ratio of fibre to matrix in the future composite sheet. Typical devices for metering are, for example, the scattering machines from Schilling-Knobel GmbH. Depending on the substrate or substrate shape or size, different types of machine are suitable.

A further possible way of producing the composite sheets of the invention is offered by the "UD tape technology" (see DE 102011005462 B3). In this process, the fibre material is not used in the form of a semifinished fibre part (woven layer, laid web, etc.) but directly as fibre roving. For the process, rovings are generally taken off in parallel from a plurality of roving reels and allowed to run together so as to give a flat, broad fibre tape. The more roving reels used, the wider this fibre tape becomes. The width can theoretically be set at will. After the fibre tapes have been brought together and spread, the thermoplastic material is applied. This can be applied either in the form of very fine powder, as film or directly from the melt onto the fibre tape. The aim of the process is ultimately in all cases to impregnate the fibre tape fully with the thermoplastic material. The resulting semifinished part is generally referred to as "UD tape".

In a subsequent step, these "UD tapes" can be brought together to give an even broader tape, as is described by way of example in DE 10 2011 090143 A1. Here, the individual "UD tapes" are conveyed in parallel through a heating/pressure zone and fused to one another. These tapes are subsequently superposed in any arrangement and number and pressed to give thick unidirectional composite sheets.

Fibre composites according to the invention are, in particular, composites having at least one unidirectional fibre layer composed of a fibre material which is embedded in a matrix based on a thermoplastic,
where the composition of the matrix contains:
A) 60-95 parts by weight of aromatic polycarbonate,
B) from 0 to 15 parts by weight of rubber-modified graft polymer,
C.3) from 1 to 25 parts by weight of a bisphenol A bis(diphenylphosphate),
D) from 0 to 30 parts by weight of talc having an average particle size $d_{50}$ of from 0.1 to 20 μm,
E) from 0.05 to 5.00 parts by weight of antidripping agent, as component G)
G.1) from 0.01 to 0.5 part by weight of heat stabilizers and/or
G.2) from 0.1 to 1.5 parts by weight of mould release agents,
where all parts by weight indicated are preferably normalized so that the sum of the parts by weight of all components A+B+C+D+E+G in the composition is 100.

The composition of the matrix preferably does not contain any further components.

Fibre composites according to the invention are used for producing components for rail vehicles which meet the smoke evolution requirements of EN 45545-2.

Further features and advantages of the fibre composite, its use and the process for producing a fibre composite can be derived from the following description of a number of examples, with reference being made to the accompanying figures.

BRIEF DESCRIPTION OF THE DRAWINGS

The figures show
FIG. 1 a composite sheet as first example of a composite according to the invention,
FIG. 2 a further composite sheet as second example of a composite according to the invention and
FIG. 3 an example of the process of the invention for producing the fibre composite.

Figure 1:
FIG. 1 shows, in side sectional view, a composite sheet as first example of a composite according to the invention. The composite sheet 2 comprises one or more superposed fibre layers 4 composed of woven glass fibre fabric which are embedded in a matrix 8 composed of thermoplastic.
Figure 2:
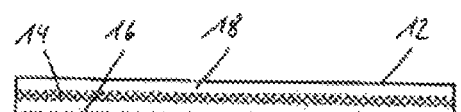
FIG. 2 shows, in side sectional view, a further composite sheet as second example of a composite according to the invention. The composite sheet 12 comprises one or more superposed first fibre layers 14 and one or more superposed second fibre layers 16 which are embedded in a matrix, with the first and second fibre layers 14, 16 being separated from one another by a layer of the matrix material.
Figure 3:
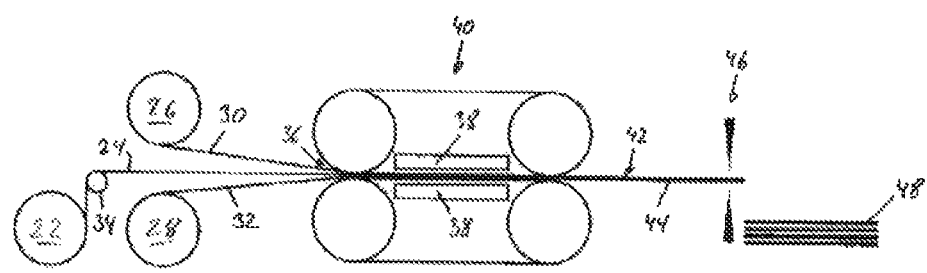
FIG. 3 schematically shows an example of the process of the invention for producing the fibre composite. In the process, a tape-like fibre layer 24 is taken off from a first reel 22 and a tape-like polymer film 30, 32 is in each case taken off from a second and third reel 26, 28. The fibre layer 24 and the polymer films 30, 32 are superposed by means of guide rollers 34 to form a layer and fed to a double belt press 40 heated by means of heating elements 38. Instead of a double belt press, it is also possible to use an interval heating press. In the double belt press 40, the layer structure 36 is pressed by applied pressure and the action of heat to form a fibre composite 42. The temperatures in the double belt press 40 are sufficiently high for the polymer films 30, 32 of the layer structure 36 to at least partially liquefy and form a matrix in which the fibre layer 24 is embedded. The fibre composite 42 leaving the double belt press 40 as continuous tape 44 can subsequently be passed to a finishing device 46 in which the tape 44 is, for example, cut to give composite sheets 48.

Composite sheets can also be produced by means of a static press. Here, films and woven layers are placed alternately on top of one another, with upper side and underside of the composite sheet being in each case finished off by a film layer.

EXAMPLES

The following examples serve to illustrate the invention in respect of the composition of the matrix:
Component A1
Linear polycarbonate based on bisphenol A and having a relative solution viscosity of $\eta_{rel}=1.28$, measured in $CH_2Cl_2$ as solvent at 25° C. and a concentration of 0.5 g/100 ml, or linear polycarbonate based on bisphenol A and having a weight average molecular weight $M_w$ of 27 500 g/mol (measured by GPC in dichloromethane using polycarbonate as standard).
Component A2
Linear polycarbonate based on bisphenol A and having a relative solution viscosity of $\eta_{rel}=1.20$, measured in $CH_2Cl_2$ as solvent at 25° C. and a concentration of 0.5 g/100 ml, or linear polycarbonate based on bisphenol A and having a weight average molecular weight $M_w$ of 20 000 g/mol (measured by GPC in dichloromethane using polycarbonate as standard).

Component B.1

ABS graft polymer having a core-shell structure and prepared by emulsion polymerization of 43% by weight, based on the ABS polymer, of a mixture of 27% by weight of acrylonitrile and 73% by weight of styrene in the presence of 57% by weight, based on the ABS polymer, of a particulate crosslinked polybutadiene rubber (average particle diameter $d_{50}$=0.35 µm).

Component C.3
Component C.3-1

Bisphenol A-based oligophosphate having a phosphorus content of 8.9% by weight.

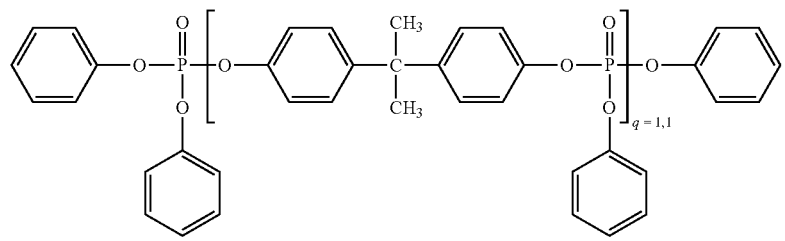

Component D1

Talc, Jetfine 3CA from Luzenac/Rio Tinto having an MgO content of 32% by weight, an $SiO_2$ content of 61% by weight and an $Al_2O_3$ content of 0.3% by weight and an average particle size $d_{50}$=1.0 µm.

Component E1:

Coagulated mixture of emulsions of fluorinated polyolefins with emulsions of a copolymer based on styrene-acrylonitrile (Cycolac INP 449 from Sabic)

Component G1

Pentaerythrityl tetrastearate as lubricant/mould release agent

Component G2

Heat stabilizer, Irganox® B900 (mixture of 80% of Irgafos® 168 and 20% of Irganox® 1076; BASF AG; Ludwigshafen/Irgafos® 168 (tris(2,4-di-tert-butylphenyl)phosphite)/Irganox® 1076 (2,6-di-tert-butyl-4-(octadecanoxycarbonylethyl)phenol)

Production and Testing of the Injection-Moulded Test Specimens:

The starting materials shown in Table 2 were compounded and pelletized on a twin-screw extruder (TSE-25) (Werner und Pfleiderer) at a speed of rotation of 225 rpm and a throughput of 20 kg/h and a machine temperature of 260° C. The finished pellets were processed on an injection-moulding machine to give the appropriate test specimens (melt temperature 240° C., tool temperature 80° C., injection velocity 40 mm/s).

The Production of the Composite Sheets is Described Below:

The starting materials shown in Table 2 were compounded and granulated on a twin-screw extruder (TSE-25) (Werner und Pfleiderer) at a speed of rotation of 225 rpm and a throughput of 20 kg/h and a machine temperature of 260° C. In a further process step, the pellets were then processed by means of a single-screw extruder having slit die to give films. These films were subsequently processed further by the film stacking process using the process parameters in Table 1 on a static press model Polystat 200T from Servitec to give composite sheets.

To produce the composite sheets, woven glass fibre fabrics from Schlösser & Cramer K G (Haan, Germany) of the type Style 3107 with a K506 Finish were used. The woven fabrics have a weight per unit area of 390 g/m² at a 2/2 twill weave. Here, films and woven layers were alternately placed on top of one another, with the upper side and underside of the composite sheet in each case being finished off by a film layer.

TABLE 1

| | B1 | B2 | B3 | B4 | B5 | B6 | B7 | B8 |
|---|---|---|---|---|---|---|---|---|
| Film thickness [µm] | 125 | 125 | 125 | 125 | 125 | 125 | 125 | 125 |
| Film layers [No.] | 5 | 5 | 5 | 5 | 5 | 5 | 5 | 5 |
| Woven layers [No.] | 4 | 4 | 4 | 4 | 4 | 4 | 4 | 4 |
| Pressing pressure [bar] | 50 | 50 | 50 | 50 | 50 | 50 | 50 | 50 |
| Pressing temp. [° C.] | 280 | 280 | 280 | 280 | 280 | 280 | 280 | 280 |
| Heating time [min] | 15 | 15 | 15 | 15 | 15 | 15 | 15 | 15 |
| Pressing time [min] | 5 | 5 | 5 | 5 | 5 | 5 | 5 | 5 |
| Cooling time [min] | 8 | 8 | 8 | 8 | 8 | 8 | 8 | 8 |
| Demoulding temp. [° C.] | 80 | 80 | 80 | 80 | 80 | 80 | 80 | 80 |

The smoke evolution Ds(4), VOF 4, Ds(max) was measured in accordance with ISO 5659-2 (irradiation intensity: 50 kW/m², without ignition flame).

The burning behaviour was measured in accordance with UL94 V on rods having the dimensions 127×12.7×X mm (X=thickness of the test specimen, i.e. 1 or 2 mm).

The compositions and also the results of the measurements are shown in Table 2 below:

TABLE 2

| In each case in % by weight | B1 | B2 | B3 | B4 | B5 | B6 | B7 | B8 |
|---|---|---|---|---|---|---|---|---|
| A1 | 60.9 | 57.8 | 56.5 | 53.5 | 52.7 | 49.6 | 48.4 | 45.3 |
| A2 | 37.6 | 35.7 | 35.0 | 33.0 | 32.6 | 30.7 | 29.9 | 28.0 |
| B1 | 0 | 0 | 7 | 7 | 0 | 0 | 7 | 7 |
| C3.1 | 0 | 0 | 0 | 0 | 13.2 | 13.2 | 13.2 | 13.2 |
| D1 | 0 | 5 | 0 | 5 | 0 | 5 | 0 | 5 |
| E1 | 1 | 1 | 1 | 1 | 1 | 1 | 1 | 1 |
| PETS G1 | 0.4 | 0.4 | 0.4 | 0.4 | 0.4 | 0.4 | 0.4 | 0.4 |
| G2 | 0.1 | 0.1 | 0.1 | 0.1 | 0.1 | 0.1 | 0.1 | 0.1 |
| Burning behaviour (injection-moulded test specimens) | | | | | | | | |
| UL 94 V/1 mm | | | | | | | | V-0 |
| UL 94 V/2 mm | | | | | | | | V-0 |
| Burning behaviour (composite sheet test specimens) | | | | | | | | |
| UL 94 V/1 mm | | | | | | | | n.p. |
| UL 94 V/2 mm | | | | | | | | n.p. |
| Smoke evolution (EN ISO 5659-2: 50 KW $m^2$/(injection-moulded test specimens, 2 mm thickness)) | | | | | | | | |
| Ds (4) (objective for HL2: <300) | 841 | 726 | >1300 | 732 | >1300 | 591 | >1300 | 783 |
| VOF4 (objective for HL2: <600) | 1540 | 1266 | >1500 | 1537 | >1500 | 1245 | >1500 | 1635 |
| Ds (max) (objective for HL2: <600) | 876 | 729 | >1300 | 736 | >1300 | 606 | >1300 | 783 |
| Smoke evolution (EN ISO 5659-2: 50 KW $m^2$/(composite sheet test specimens, 1 mm thickness)) | | | | | | | | |
| Ds (4) (objective HL2: <300) | 307 | 348 | 389 | 334 | 260 | 265 | 275 | 260 |
| VOF4 (objective for HL2: <600) | 633 | 611 | 677 | 740 | 420 | 494 | 551 | 581 |
| Ds (max) (objective for HL2: <600) | 347 | 412 | 451 | 385 | 303 | 288 | 299 | 314 |

The test specimens have the dimensions 75 mm × 75 mm.
n.p.: not passed

It can be seen from Table 2 that injection-moulded test specimens produced from the compositions of Examples B1 to B4 without flame retardant (C3-1) do not meet the smoke evolution requirements, regardless of the presence of talc and/or component B1. Furthermore, composite sheets produced from the compositions of Examples B1 to B4 which do not contain any flame retardant C3-1 likewise do not, regardless of the addition of talc and/or component B1, meet the smoke evolution requirements of EN 45545-2, namely Ds(4) in accordance with ISO 5659-2: <300,
VOF 4 in accordance with ISO 5659-2: <600 and
Ds(max) in accordance with ISO 5659-2: <600.

It can even be seen that injection-moulded bodies made from compositions containing component C3-1 as flame retardant (B5 to B8) have a significantly poorer smoke evolution than injection-moulded bodies made from compositions which do not contain any flame retardant (B1 to B4).

However, composite sheets made from the compositions B5 to B8 surprisingly meet the smoke evolution requirements. This is all the more surprising since the smoke evolution cannot be concluded from the burning behaviour. Thus, injection-moulded bodies produced from the composition B8 meet the requirements of UL 94-V0 even at a test specimen thickness of 1 mm, while corresponding composite sheet test specimens do not pass the UL 94 test even at a thickness of 2 mm.

The invention claimed is:

1. A fibre composite, comprising at least one fibre layer of a fibre material which is embedded in a matrix based on a thermoplastic, where the composition of the matrix consists of:

A) 60-95 parts by weight of aromatic polycarbonate and/or aromatic polyester carbonate, B) from 0 to 15 parts by weight of rubber-modified graft polymer, C) one of the components C.1, or C.2 having the composition and amount indicated in each case below:

C.1) 1.0-14.5 parts by weight of a cyclic phosphazene selected from the group consisting of propoxyphosphazene, phenoxyphosphazene, methylphenoxyphosphazene, aminophosphazene and fluoroalkylphosphazenes and phosphazenes having the following structures

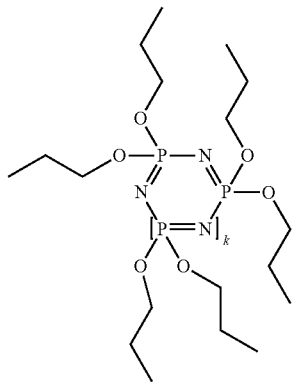

-continued

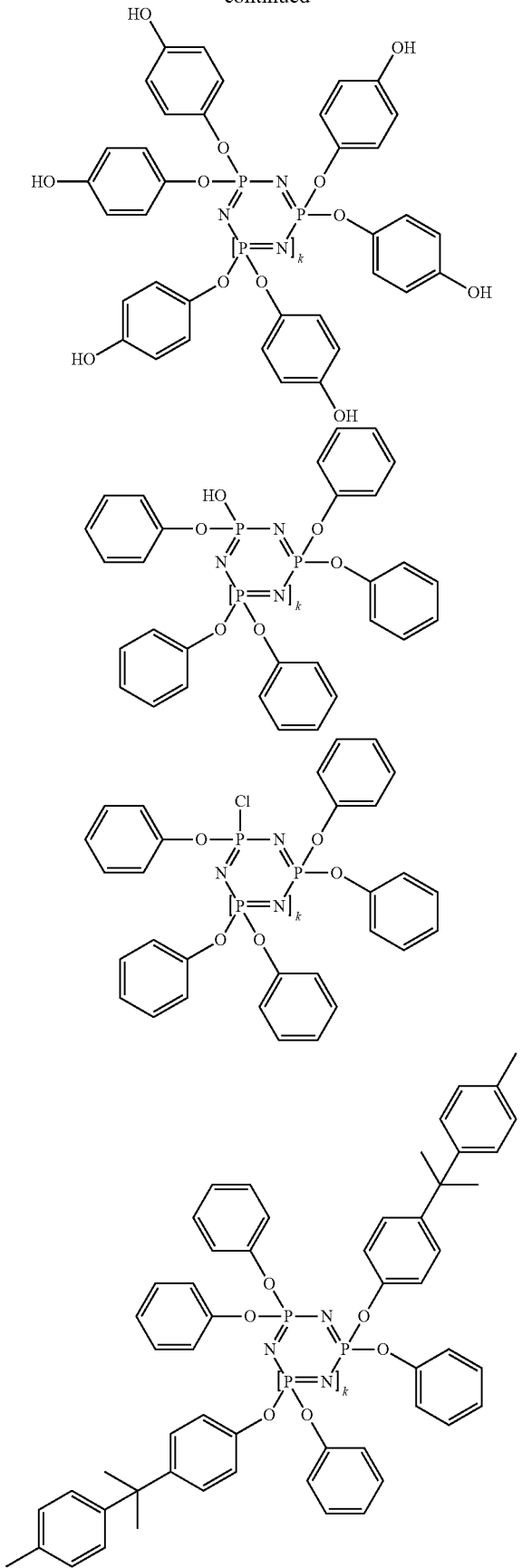

-continued

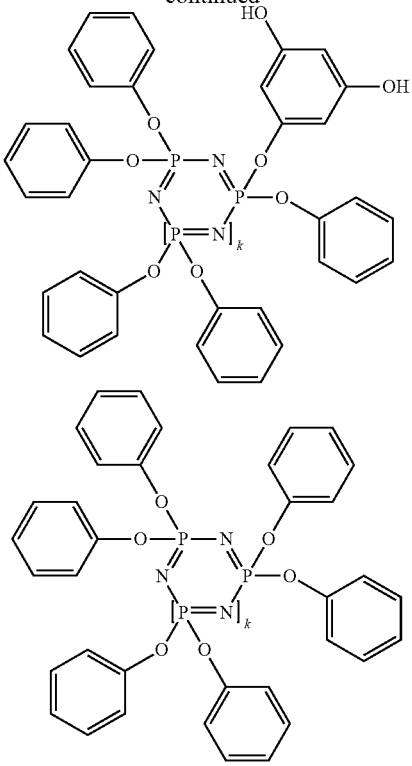

k is 1 or an integer from 1 to 10,
where the proportion of trimer (k=1) is from 50 to 98 mol % based on the component C.1,
C.2) from 0.1 to 30 parts by weight of a salt of phosphinic acid,
D) from 0 to 30 parts by weight of talc having an average particle size $d_{50}$ of from 0.1 to 20 µm,
E) from 0.05 to 5.00 parts by weight of antidripping agent,
where all parts by weight indicated are normalized so that the sum of the parts by weight of all components A+B+C+D+E in the composition is 100.

2. The fibre composite according to claim 1, wherein the composition of the matrix additionally contains:
F) 0 15.0 parts by weight of vinyl (co)polymer or polyalkylene terephthalate,
G) 0 15.0 parts by weight of additives,
where all parts by weight indicated are normalized so that the sum of the parts by weight of all components A+B+C+D+E+F+G in the composition is 100.

3. The fibre composite according to claim 1, wherein the composition of the matrix contains:
C.3) from 7.0 to 16.0 parts by weight of an oligomeric phosphate.

4. The fibre composite according to claim 1, wherein graft polymers B comprise graft polymers composed of:
B.1) from 5 to 95 parts by weight, of a mixture of
B.1.1) from 50 to 95 parts by weight of styrene, α-methylstyrene, methyl-ring-substituted styrene, $C_1$- to $C_8$-alkyl methacrylate, in particular methyl methacrylate, $C_1$- to $C_8$-alkyl acrylate, or mixtures of these compounds and
B.1.2) from 5 to 50 parts by weight of acrylonitrile, methacrylonitrile, $C_1$- to $C_8$-alkyl methacrylates, $C_1$- to $C_8$-alkyl acrylate, or mixtures of these compounds on
B.2) from 5 to 95 parts by weight, of a rubber-containing graft base selected from among butadiene rubbers, acrylate rubbers and silicone-acrylate rubbers.

5. The fibre composite according to claim 1, wherein the fibre layer is configured as unidirectional fibre layer, as woven layer or laid web, as knitted fabric, crocheted fabric or braid, or as long fibres in the form of tangled fibre mats or nonwovens or as a combination thereof.

6. The fibre composite according to claim 1, wherein the fibre material comprises fibres of one or more of the following types of fibre: glass fibres, carbon fibres, basalt fibres, aramid fibres, liquid crystal polymer fibres, polyphenylene sulphide fibres, polyether ketone fibres, polyether ether ketone fibres, polyetherimide fibres.

7. The fibre composite according to claim 1, wherein the volume content of the fibre material based on the total volume of the fibre composite is in the range from 30 to 60% by volume.

8. The fibre composite according to claim 1, wherein the fibre composite is in the form of a fibre composite sheet.

9. The fibre composite according to claim 8, wherein the fibre composite sheet has a thickness in the range from 0.5 to 3 mm.

10. The fibre composite according to claim 1, wherein the fibre composite or the fibre composite sheet has the following properties:
Ds(4) in accordance with ISO 5659-2: <300,
VOF 4 in accordance with ISO 5659-2: <600 and
Ds(max) in accordance with ISO 5659-2: <600.

11. An article comprising the fibre composite according to claim 1, wherein the article is a component for a rail vehicle.

12. A process for producing a fibre composite according to claim 1, comprising
forming a layer structure made up of superposed layers from at least one fibre layer of a fibre material and from polymer layers composed of at least one polymer film arranged on both sides of the fibre layer and
pressing the layer structure under applied pressure and the action of heat to form a fibre composite,
wherein the polymer film has a composition corresponding to the matrix of the fibre composite.

13. The fibre composite according to claim 1, wherein the composition of the matrix contains C.1, and wherein C.1 is phenoxyphosphazene having a proportion of oligomers having $k=1$ of from 50 to 98 mol %.

14. The fibre composite according to claim 1, wherein C.1 is

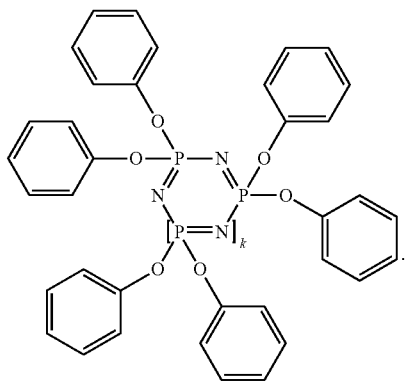

* * * * *